United States Patent
Keeton et al.

(10) Patent No.: US 8,725,730 B2
(45) Date of Patent: May 13, 2014

(54) RESPONDING TO A QUERY IN A DATA PROCESSING SYSTEM

(75) Inventors: Kimberly Keeton, San Francisco, CA (US); Charles B. Morrey, III, Palo Alto, CA (US); Craig A. Soules, San Francisco, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 386 days.

(21) Appl. No.: 13/113,507

(22) Filed: May 23, 2011

(65) Prior Publication Data
US 2012/0303627 A1    Nov. 29, 2012

(51) Int. Cl.
G06F 17/30    (2006.01)
G06F 17/00    (2006.01)

(52) U.S. Cl.
USPC .......................................... 707/736; 707/741

(58) Field of Classification Search
USPC .................................................. 707/741, 736
See application file for complete search history.

(56) References Cited

U.S. PATENT DOCUMENTS

| | | |
|---|---|---|
| 7,103,590 B1 | 9/2006 | Murthy |
| 7,472,113 B1 | 12/2008 | Watson |
| 7,730,058 B2 | 6/2010 | Sareen |
| 7,809,958 B2 | 10/2010 | Trapp |
| 2004/0260685 A1 | 12/2004 | Pfleiger |
| 2005/0033803 A1* | 2/2005 | Vleet et al. ............ 709/203 |
| 2007/0038658 A1 | 2/2007 | Ghosh |
| 2007/0115986 A1* | 5/2007 | Shankara ............ 370/392 |
| 2008/0071904 A1 | 3/2008 | Schuba |
| 2009/0070313 A1 | 3/2009 | Beyer |
| 2010/0306263 A1 | 12/2010 | Cassetti |

FOREIGN PATENT DOCUMENTS

CN    101609449    12/2009

OTHER PUBLICATIONS

Kimberly Keeton et al., International Application No. PCT/US10/41307 filed Jul. 8, 2010 entitled Resource Assignment for Jobs in a System Having a Processing Pipeline (37 pages).
Craig A.N. Soules et al., U.S. Appl. No. 12/703,858, filed Feb. 11, 2010 entitled Storing Update Data Using a Processing Pipeline (44 pages).
Spiliopoulou et al., Modelling Resource Utilization in Pipelined Query Execution, 1996 (9 pages).
Harizopoulos et al., QPipe: A Simultaneously Pipelined Relational Query Engine, SIGMOD 2005,(12 pages).
Arpaci-Dusseau, University of Wisconsin, Madison, ACM Transactions on Computer Systems, vol. 21, No. 1, Feb. 2003, Run-Time Adaptation in River (51 pages).
Moffat et al., Abstract, A Pipelined Architecture for Distributed Text Query Evaluation, vol. 10, No. 3, Oct. 2006 (2 pages).
Chang et al., Bigtable: A Distributed Storage System for Structured Data, OSDI '06: 7th USENIX Symposium on Operating Systems Design and Implementation, 2006 (pp. 205-218).
Wessels, Duane—Squid: The Definitive Guide, Jan. 2004, ISBN: 0-596-00162-2 (770 pages).
Wikipedia, Bloom Filter dated on or before Jan. 2011 (13 pages).
Little, The Computer Journal, vol. 45, No. 6, 2002—Using Bloom Filters to Speed-up Name Lookup in Distributed Systems (8 pages).
Quinlan, Venti: A new approach to archival storage, Proceedings of the FAST 2002 Conference on File and Storage Technologies, Jan. 2002 (14 pages).
James Adam Cipar, U.S. Appl. No. 13/105,294 entitled Assigning Resources for Tasks, filed May 11, 2011 (41 pages).
Kubiatowiz, Asplos, OceanStore: An Architecture for Global-Scale Persistent Storage, 2000 (12 pages).

* cited by examiner

*Primary Examiner* — Yicun Wu

(57) ABSTRACT

A data processing system includes a plurality of processing stages. In response to a query, a membership structure is accessed to determine whether partially processed data from a particular one of the processing stages.

24 Claims, 3 Drawing Sheets

RESPONDING TO A QUERY IN A DATA PROCESSING SYSTEM

BACKGROUND

An organization can have a relatively large amount of data that users or applications within the organization may request to perform data mining, analysis, search, or other tasks. As systems become more complex and as the amount of data increases, the ability to efficiently access data maintained by such systems has become more challenging.

BRIEF DESCRIPTION OF THE DRAWINGS

Some embodiments are described with respect to the following figures.

DETAILED DESCRIPTION

A data processing system can have multiple processing stages for performing respective processing of data. After one processing stage has completed its respective processing, the processing stage can send processed data to another processing stage for further processing. In some implementations, a data processing system having multiple processing stages is arranged as a processing pipeline since the multiple processing stages are arranged to sequentially apply processing of data that passes through the processing pipeline.

In the ensuing discussion, reference is made to implementations applicable to a processing pipeline. However, techniques or mechanisms according to some implementations can be applied to other types of data processing systems. The data processing system can be implemented with a computer system or a combination of computer systems, where each computer system can have one or multiple processors.

In some examples, a processing pipeline is configured to process data updates. Data updates can be provided from various sources. A "data update" refers to creation of data, modification of data, and/or deletion of data. Because there can be a relatively large amount of data updates to be processed by a processing pipeline, it may take a relatively long period of time before the data updates being processed by the processing pipeline are available for access by queries submitted to the processing pipeline, if queries are unable to access intermediate results of the processing pipeline.

In accordance with some implementations, techniques or mechanisms are provided to obtain more timely results from the processing pipeline in response to a query. A query can be associated with a particular freshness specification, where "freshness" of data refers to how up-to-date results should be for a response to the query. In some applications, a user may want a relatively quick response to a query, but the user may be willing to accept results that are out-of-date by a certain amount of time, as indicated by a freshness specification (e.g., out-of-date by 12 hours, one day, etc.). On the other hand, other users or applications (such as a virus scanning application) may want an up-to-date response regarding data in the processing pipeline, at the expense of a slower response time to a query. Note that although more up-to-date results can be obtained from the intermediate stages of the pipeline, it can be costly to examine the intermediate data associated with the intermediate stages, so that such intermediate data is examined only if the intermediate data is likely to contain responsive results.

Figure 1:
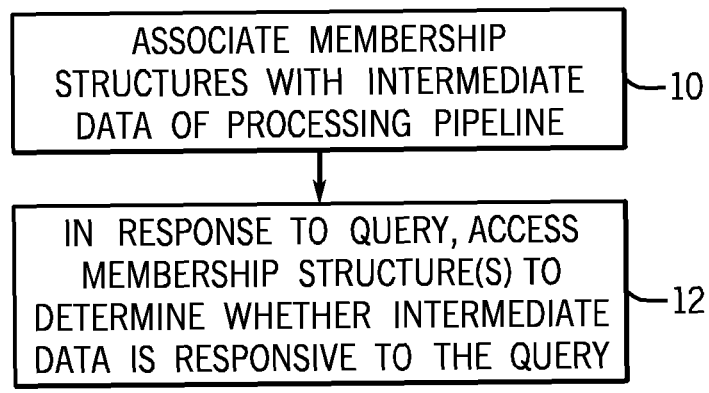
FIG. 1 is a flow diagram of a process according to some implementations.

If the amount of intermediate data being processed by the processing pipeline is relatively large, a determination of whether the intermediate data being processed by the processing pipeline contains data relevant to a query can take a relatively long time if a search of the intermediate data is to be performed. To address such issue in accordance with some implementations, as shown in FIG. 1, one or multiple membership structures are associated (at 10) with intermediate data provided by at least a subset of processing stages of the processing pipeline. Each processing stage can output intermediate data in an output structure, where the output structure refers to any container (e.g. a table, file, etc.) of data. In some implementations, the membership structure associated with the output structure of each processing stage in the subset can be a membership structure that provides a probabilistic response regarding whether the corresponding output structure contains responsive data (requested by a query). A "probabilistic response" is a response that indicates that the corresponding output structure is likely to include responsive data. As explained further below, a membership structure that provides a probabilistic response is a Bloom filter. In alternative implementations, other types of membership structures can be used instead, such as a tree-based index (e.g. B-tree) or other types of structures that provide indications of whether data corresponding to a key is located in the corresponding output structure. A tree-based index arranges keys in a hierarchical arrangement, in which keys are placed in locations of the tree-based index according to the values of the keys. A "key" refers to an attribute (e.g., a column of a table) or a combination of attributes (e.g., combination of columns of a table) in data used in the membership structure to indicate whether the corresponding data exists in the corresponding output structure.

As further depicted in FIG. 1, in response to a query, the membership structure(s) can be accessed (at 12) to determine whether the respective output structure(s) contain(s), or is (are) likely to contain, intermediate data responsive to the query, and where such responsive data may be located. If the membership structure is one that provides a probabilistic response (such as a Bloom filter), then the determination performed at 12 can be relatively quick and efficient.

Whether data is responsive to a query is based on predicates and other conditions specified in the query, and further based on the freshness specification of the query. The intermediate data being processed by the pipeline that is considered for responding to the query includes just intermediate data that is within the freshness bound as specified in the freshness specification of the query. In some examples, the output structures of the processing stages in the processing pipeline may be associated with timestamps indicating respective receipt times (times of receipt of respective data by the processing pipeline)—these timestamps can be used to identify which of the output structures should be considered and which can be disregarded when processing a query with a freshness specification.

For example, if the requester specifies that the answer to a query should be up-to-date to within 30 minutes of submission of the query, then the output structures in the processing pipeline associated with timestamps within that 30-minute time window should be considered to locate data responsive to the query.

Additionally, techniques or mechanisms according to some implementations are able to incrementally refine an answer to a given query over time, by starting with a quick but out-of-date answer to the query, and then incrementally refining the answer as the membership structure(s) associated with the intermediate data provided by the processing stage(s) is accessed to locate relevant data. Moreover, a requester (e.g., user or application) can be provided with an indication of how long it may take to get an up-to-date answer, such that the requester can decide whether it is worthwhile to wait for the final (up-to-date) answer, or to use a currently available out-of-date answer.

Figure 2:
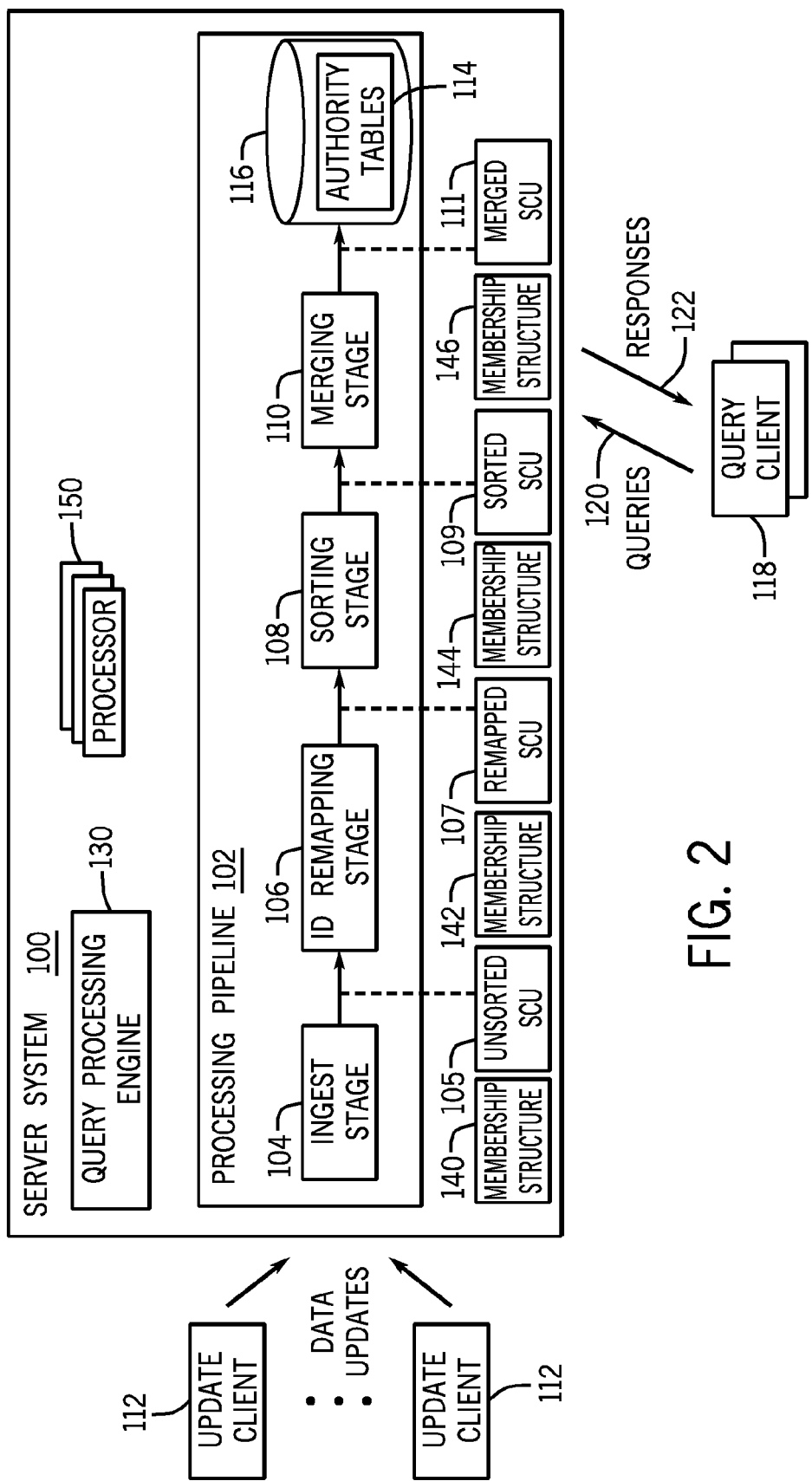
FIG. 2 is a block diagram of a data processing system having a processing pipeline according to some implementations.

A representation of an example arrangement that includes a server system 100 having a processing pipeline 102 according to some implementations is depicted in FIG. 2. The processing pipeline 102 has an ingest stage 104, an ID (identifier) remapping stage 106, a sorting stage 108, and a merging stage 110. Although specific stages of the processing pipeline 102 are depicted in FIG. 2, it is noted that in different implementations alternative stages or additional stages can be provided in the processing pipeline 102.

Data updates from various update clients 112 are provided to the server system 100 for processing by the processing pipeline 102. Examples of the update clients 112 include various machines that can store data within an organization, where the machines can include desktop computers, notebook computers, personal digital assistants (PDAs), various types of servers (e.g., file servers, email servers, etc.), or other types of devices. The machines making up the update clients 112 can provide sources of stock market transactions, web logs, cluster logs, e-commerce history, and so forth.

A data update that is sent to the server system 100 can include the metadata associated with the actual data stored on the update clients 112. In such examples, the data update includes the metadata but not the actual data. Examples of metadata include metadata computed based on content of the data, including hashes (produced by applying hash functions on actual data), term vectors (containing terms in the data), fingerprints, feature vectors, and so forth. Other examples of metadata include file system metadata, such as file owners or creators, file size and security attributes, or information associated with usage of the data, such as access frequency statistics. Alternatively, instead of just metadata, actual data can be stored in the server system 100, such as data associated with timestamps, e.g. sensor observations, log entries, transaction records, social networking messages, and so forth.

As further depicted in FIG. 2, query clients 118 can submit queries 120 to the server system 100. A query processing engine 130 in the server system 100 responds to the queries 120 with responses 122 that are provided back to the query clients 118. The processing pipeline 102 provides the ability to trade query result freshness for query performance in the presence of ongoing data updates.

As further shown in FIG. 2, processors 150 are provided in the server system 100. The processors 150 can be part of one or multiple computer nodes. In some implementations, the query processing engine 130 and the processing stages 104, 106, 108, and 110 may be provided on respective computer nodes.

In some implementations, updates from the update client(s) 112 are applied to an "authority table" 114 stored in a data store 116 of the server system 100. An authority table 114 refers to a repository of the data that is to be stored by the server system 100, where the authority table 114 is usually the table that is searched in response to a query for data. The data store 116 can store multiple authority tables 114, in some examples. More generally, the authority tables 114 are referred to as data tables, which are contained in a database.

Another type of table that can be maintained by the server system 100 is an update table, which is an intermediate table that contains additions, modifications, and/or deletions (based on the data updates received from the update clients 112) that are to be applied to an authority table 114 after processing through the processing pipeline 102. An update table has the same schema as the associated authority table, as well as additional columns to indicate the type of operation and a timestamp. The various processing stages (104, 106, 108, 110) are configured to process update tables. The update tables can be stored on nodes different from a node (or nodes) storing authority tables.

In some examples, multiple updates can be batched into a single self-consistent update (SCU) (more generally referred to as a "batch of updates"). The SCU is an example of the "output structure" discussed in connection with FIG. 1 above. Each SCU includes one or plural update tables containing update data. The SCU is applied in the server system 100 as a single atomic unit, and is not considered durable until all the individual updates in the batch (SCU) are written to stable (persistent) storage. Atomic application of data updates of an SCU to the stable storage means that all data updates of the SCU are applied or none are applied. Data updates in any one SCU are isolated from data updates in another SCU. Batching of data updates may be omitted in other implementations.

The ingest stage 104 of the processing pipeline 102 batches (collects) incoming updates from update clients 112 into one or plural unsorted SCUs 105.

As shown in FIG. 2, the output (105) of the ingest stage 104 is an unsorted SCU (or multiple unsorted SCUs 105). The unsorted SCU(s) 105 is (are) provided to the ID remapping stage 106, which transforms initial (temporary) ID(s) of the SCU(s) 105 into global ID(s). Effectively, the ID remapping stage 106 maps an ID in a first space to an ID in a second space, which in some implementations is a global space to provide a single, searchable ID space. The initial (temporary) IDs used by the ingest stage 104 are assigned to each unique entity (for example, file names) as those entities are processed. ID's are used in place of relatively large pieces of incoming data such as file path names, which improves query processing times and reduces usage of storage space. In addition, in implementations where the ingest stage 104 is implemented with multiple processors, temporary IDs generated by each of the processors can be remapped to the global ID space. In this way, the processors of the ingest stage 104 do not have to coordinate with each other to ensure generation of unique IDs, such that greater parallelism can be achieved.

The output of the ID remapping stage 106 includes one or plural remapped SCUs 107 (within each remapped SCU 107, an initial ID has been remapped to a global ID). Each remapped SCU 107 is provided to the sorting stage 108, which sorts one or plural update tables in the remapped SCU by one or plural keys to create a sorted SCU 109 that contains one or plural full searchable indexes (e.g. extent-based indexes). A full searchable index is an index produced from one or multiple columns (attributes) of each sorted SCU.

The sorted SCU(s) 109 is (are) provided to the merging stage 110. The merging stage 110 combines individual sorted SCUs to further improve query performance. The output of the merging stage 110 includes one or multiple merged SCUs 111. Each merged SCU 111 can also be associated with a full searchable index. The merged SCU(s) 111 is (are) merged into the authority table(s) 114. Note that there can be several types of merging—the merging stage 110 can produce merged SCUs, or alternatively, a new version of an authority table (with updates merged in).

As noted above, in the processing pipeline depicted in FIG. 2, a challenge of processing a query such as a query 120 from a query client 118 is determining whether results found in the authority table(s) 114 are out of date due to responsive data being present in SCU(s) of the processing pipeline 102. To allow the query processing engine 130 to efficiently and quickly ascertain which SCUs may contain data relevant to the query, at least some of the SCUs of intermediate stages of the processing pipeline 102 are associated with membership structures that can be accessed to determine whether a corresponding SCU may contain data relevant to a query. In the example of FIG. 2, a membership structure 140 is provided for each unsorted SCU 105, a membership structure 142 is provided for each remapped SCU 107, a membership structure 144 is provided for each sorted SCU 109, and a membership structure 146 is provided for each merged SCU 111.

If there are multiple unsorted SCUs 105, then multiple corresponding membership structures 140 can be provided. Alternatively, one membership structure 140 can be provided for multiple unsorted SCUs 105. Similarly, if multiple remapped SCUs 107 are provided, then multiple corresponding membership structures 142 can be associated with the remapped SCUs 107. Alternatively, one membership structure 142 can be associated with the multiple remapped SCUs 107. In similar fashion, one or multiple membership structures 144 or 146 can be provided for multiple sorted SCUs 109 or merged SCUs 111, respectively.

As noted above, in some implementations, the membership structures 140, 142, 144, and 146 are Bloom filters. A Bloom filter can be used to identify whether a key may be contained in a respective SCU. Note that a Bloom filter may produce a false positive—in other words, the Bloom filter can indicate that a key is contained within the respective SCU even though that is not true. However, a Bloom filter does not produce false negatives—in other words, if a Bloom filter indicates that a key is not in the respective SCU, then that indication would be accurate. A Bloom filter is a probabilistic data structure used to test whether an element is a member of a set. Elements can be added to the set, but not removed from the set. The more elements that are added to the sets, the larger the probability of false positives.

Figure 3:
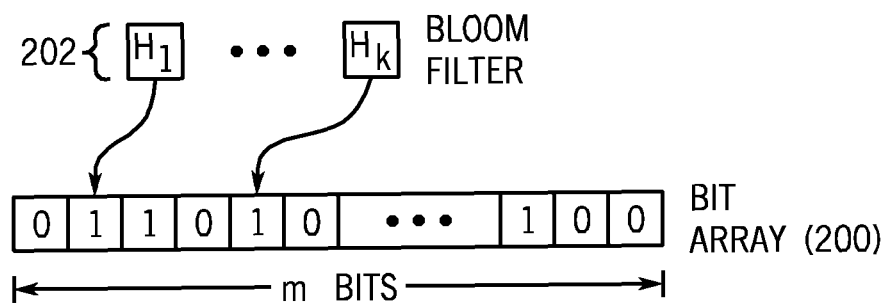
FIG. 3 is a schematic diagram of a Bloom filter useable according to some implementations.

As shown in FIG. 3, a Bloom filter can be implemented as a bit array 200 of m bits, where m is greater than one. There are k different hash functions ($H_1, \ldots, H_k$) 202 associated with the Bloom filter, where k is greater than one. Given an input provided to each of the k hash functions, each of the k hash functions maps to one of the m array positions in the bit array 200. Different inputs cause a given hash function to map to different bit positions of the bit array 200.

To add a given element to the Bloom filter, the given element is fed to each of the k hash functions 202 to obtain k array positions. The bits at each of these k array positions in the bit array 200 are set to 1 to indicate addition of the given element (the bits of the bit array 200 at the remaining positions are left unchanged). Note that if previously other element(s) have already been added to the Bloom filter, then some of the k array positions mapped from the hash functions due to the added given element may already be set to the value 1.

To query for the given element in the Bloom filter (in other words, to test whether the given element is in the set represented by the Bloom filter), the given element is fed to each of the k hash functions to obtain k respective array positions. If any of the bits of these positions is 0, the given element is not in the set—if the given element were in the set, then all of the bits at the k array positions mapped from the respective hash functions would have been set to 1. Since it is possible that the k array positions (mapped from the k hash functions due to application of the given element that is the subject of the query) may have been set to the value 1 due to insertion of other elements into the set, a positive indication that the given element is in the set may be a false positive.

Note that generally, a Bloom filter is relatively efficient to build as data is being processed by various stages of a processing pipeline. In addition, a Bloom filter is a fixed-size entity. Adding an element to the Bloom filter does not increase its size—therefore, a Bloom filter is also relatively space efficient.

In alternative examples, membership structures such as 144 and 146 are not associated with the sorted SCU 109 or the merged SCU 111, since each of the sorted and merged SCUs are sorted and can be associated with respective full searchable indexes already. In contrast, the unsorted and remapped SCUs 105 and 107 are unsorted SCUs that are not associated with full searchable indexes, and hence are harder to search efficiently.

As data updates are received by ingest stage 104 and ID remapping stage 106, the corresponding Bloom filters 140, 142, 144, and 146 can be updated. Each Bloom filter 140, 142, 144, or 146 is valid for the lifetime of the corresponding SCU. The "lifetime" of an SCU at a particular stage extends until the SCU completes processing in the next stage; for example, an unsorted SCU is valid until it is sorted, and a sorted SCU is valid until it is merged. If there is a representation of an SCU at a later stage in the processing pipeline, that version should supercede a version from an earlier stage of the processing pipeline, since the later SCU is easier to query.

There are several possibilities for where the Bloom filters 140, 142, 144, and 146 can be stored. If each Bloom filter is stored with the corresponding SCU (at an SCU computer node), then the Bloom filter would have the same availability and reliability guarantees as the SCU. Alternatively, the Bloom filters can be stored at a query computer node (that contains the query processing engine 130)—in this case, a roundtrip delay from the query computer node to the SCU computer node (that stores the corresponding SCU) can be avoided for the Bloom filter lookup. If a Bloom filter is stored in both places (both the query computer node and SCU computer node), then both benefits noted above can be achieved at the cost of some additional storage space utilization. During the merge phase (merging of SCUs at the merging stage 110 of FIG. 2), the system can choose to merge the Bloom filters of merged SCUs to save space and/or improve filter lookup performance.

Although reference is made to implementations in which the membership structures 140, 142, 144, and 146 are Bloom filters, it is noted that techniques according to some implementations can be applied to other types of membership structures.

Figure 4:
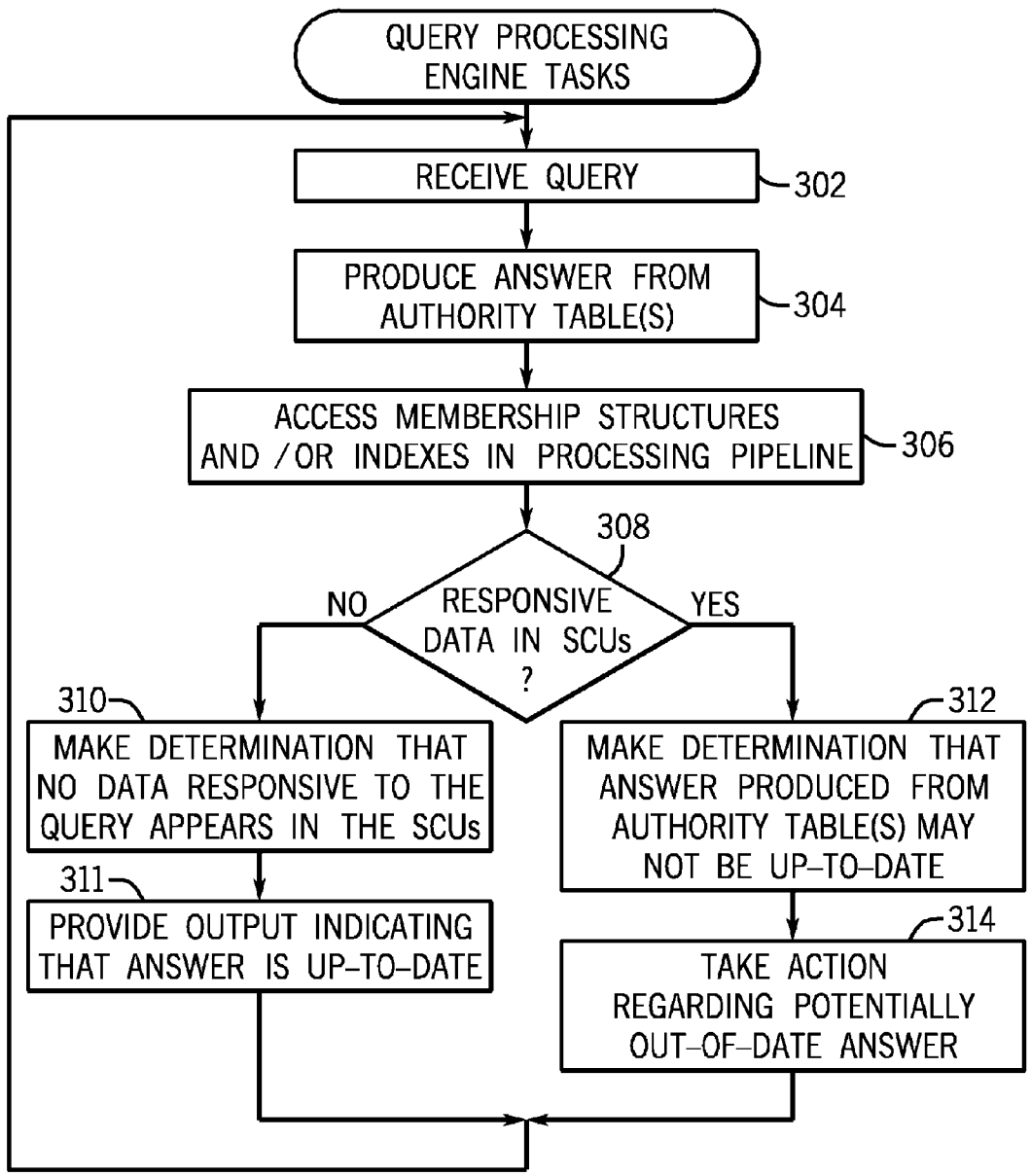
FIG. 4 is a flow diagram of a process of a query processing engine, in accordance with further implementations.

FIG. 4 is a flow diagram of a process performed by the query processing engine 130. The query processing engine 130 receives (at 302) a query. In response to the query, query processing engine 130 produces (at 304) an answer from the authority table(s) 114 (FIG. 2). Also, the query processing engine 130 accesses (at 306) various membership structures and/or full searchable indexes in the processing pipeline 102, including the Bloom filters 140, 142, 144, and 146 associated with respective SCUs, and any full searchable indexes, to determine whether data responsive to the query may be located in the SCUs 105, 107, 109, and/or 111. Note that only those member structures and/or full searchable indexes associated with SCUs within the freshness bound have to be consulted. As discussed above, the freshness bound corresponds to the freshness specification of the received query.

Note that the query processing engine 130 checks the Bloom filters 140, 142, 144, and 146 and the full searchable indexes before actually querying the SCU.

If the query processing engine 130 determines (at 308) that the Bloom filters 140 and 142 and full searchable indexes indicate that the requested data is not in the SCUs 105, 107, 109, and 111 (in other words, the requested key of the query is not found in the indexes), then the query processing engine 130 can make a positive determination (at 310) that no data updates involving data responsive to the query appear in the SCUs 105, 107, 109, and 111. As a result, the query processing engine 130 is able to provide (at 311) an output indicating that an answer retrieved from the authority table(s) 114 is up-to-date.

On the other hand, if the query processing engine 130 determines (at 308) from the membership structures 140 and 142 and any full searchable indexes that responsive data may be present in the SCUs 105, 107, 109, and 111, then the query processing engine 130 makes (at 312) a determination that the answer that is produced from the authority table(s) 114 in response to the query may not be up-to-date. If the query processing engine 130 determines that an answer produced from the authority table(s) 114 may not be up-to-date, then the query processing engine 130 can take (at 314) one of several actions: (1) indicate that the answer provided from the authority table(s) 114 may be potentially out-of-date, and automatically update the answer produced from the authority table(s) 114 by accessing the respective SCU(s) 105, 107, 109, and/or 111 (without first consulting the requestor), or (2) indicate that the answer provided from the authority table(s) 114 may be potentially out-of-date, and provide an indication to the requester of an estimated amount of time that would be involved in obtaining up-to-date data from the processing pipeline 102 (in this scenario, the query processing engine 130 can also prompt the requester to provide either a positive or negative response regarding whether or not the requester wishes the answer to be updated).

In action (2) above, the estimated amount of time can be calculated by the query processing engine 130 based on the number of SCUs that have to be examined and where those SCUs are located in the processing pipeline. Alternatively, the indication of the estimated amount of time can be simply a listing of the SCUs that have to be examined and where those SCUs are located in the processing pipeline—the listing provides an approximate indication of how long it may take to get an up-to-date answer (to within the target freshness specification).

If action (1) were implemented, or if action (2) were implemented and a positive response was received from the requester that the requester wishes to update the answer, then the query processing engine 130 performs successive (iterative) refinement of the answer. The answer is refined by looking at the SCUs within the freshness bound that may contain the requested key.

In some implementations, for improved efficiency, in a processing pipeline where a data update overwrites an entire row of the authority table 114, rather than only partially updating the row, the query processing engine 130 can respond to a query by identifying the most recent SCU within the freshness bound that contains the requested key. Once this most recent SCU is identified, the search can be terminated, as the most up-to-date version of the row has been identified—in other words, the query processing engine 130 does not have to determine if less recent SCUs contain the requested key. The most recent SCU may be one that has just been ingested at the ingest stage 104, for example. Alternatively, the most recent SCU may be located at another processing stage of the processing pipeline.

In alternative implementations, if one Bloom filter per SCU is considered too expensive, a single counting Bloom filter can be used to keep track of whether or not responsive data is present in multiple SCUs, at the expense of not knowing which SCU the responsive data is in. Unlike traditional Bloom filters, where elements can be inserted but not removed, counting Bloom filters provide a way to implement a delete operation on a Bloom filter without having to recreate the Bloom filter. In a counting filter, the bit array positions are extended from being a single bit (as shown in FIG. 3), to an n-bit counter. In fact, regular Bloom filters can be considered as counting filters with a bucket size of one bit.

The insert operation of a counting Bloom filter involves incrementing the value of the buckets mapped by the corresponding hash functions (similar to hash functions 202 of FIG. 3). The lookup operation of a counting Bloom filter checks that each of the requested buckets is non-zero. The delete operation involves decrementing the value of each of the respective buckets in the counting Bloom filter.

In other implementations, if it is desired to use a single Bloom filter and also be able to determine which SCU may have updates, then a single traditional Bloom filter can be used where the search key plus the SCU number is used as the lookup key to the Bloom filter. The SCU number identifies the corresponding SCU (different SCUs are assigned different respective SCU numbers). In such implementations, the lookup key into the Bloom filter is represented as (key_value, SCU number), where key_value represents the search key and SCU number represents the number of the SCU. The search key is the key based on the data in the SCU. To perform a lookup of the Bloom filter, the (key_value, SCU number) combination is provided to the hash functions (202 in FIG. 3) of the Bloom filter, to map (key_value, SCU number) to respective bit positions of the bit array 200 in FIG. 3.

In some implementations, Bloom filters can be associated with respective SCUs, as well as with respective requestors (e.g., users or applications). Thus, the Bloom filters are provided on a per-requester, per-SCU basis. In this way, requester-specific views into the data can be provided, by examining Bloom filters associated with a particular requester to determine whether or not respective SCUs contain responsive data to a query. In such implementations, a query only has to consult the SCUs that may contain the keys that are uploaded by a particular requester and fall within the freshness bound.

In further implementations, Bloom filters can be used to replace ranges in range-based extent indexes. A range-based extent index stores minimum and maximum key values associated with an extent in the underlying table or other structure—if the extent is large, then the range between the minimum and maximum key values can also be large. A range-based extent index allows a system to quickly identify the extent (or extents) that may contain a requested key (or keys). However, for sparse tables, relatively high false positive rates may result, as the extent ranges of the range-based extent index may cover a large range of keys. Replacing the range-based extent index with a Bloom filter can reduce the false positive rate.

Machine-readable instructions of modules described above (such as the query processing engine 130 of FIG. 2) are loaded for execution on a processor (such as one or more CPUs). A processor can include a microprocessor, microcontroller, processor module or subsystem, programmable integrated circuit, programmable gate array, or another control or computing device.

Data and instructions are stored in respective storage devices, which are implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method for use in a data processing system having a plurality of processing stages, comprising:
producing an output structure by a particular one of the processing stages, wherein the processing stages perform respective different operations on data received by the data processing system, and wherein the output structure contains partially processed data produced by the particular processing stage;
associating a membership structure with the output structure produced by the particular processing stage; and
in response to a query received from a query client after the output structure has been produced by the particular processing stage, accessing, by at least one processor, the membership structure to determine whether the membership structure indicates that data responsive to the query is present in the partially processed data in the output structure.

2. The method of claim 1, wherein the data processing system includes a processing pipeline having the plurality of processing stages, the method further comprising the plurality of processing stages performing a sequence of corresponding operations with respect to the data received by the data processing system.

3. The method of claim 2, wherein associating the membership structure with the output structure produced by the particular processing stage comprises associating the membership structure with the output structure produced by one of the processing stages before a last processing stage in the processing pipeline.

4. The method of claim 3, wherein the plurality of processing stages include a sorting stage to sort data in the data updates, and wherein associating the membership structure with the output structure produced by the particular processing stage comprises associating the membership structure with the output structure produced by the particular processing stage before the sorting stage in the processing pipeline.

5. The method of claim 1, wherein an indication provided by the membership structure that data responsive to the query is present in the output structure is potentially a false positive.

6. The method of claim 5, wherein the membership structure includes a Bloom filter.

7. The method of claim 5, wherein the membership structure does not produce a false negative when the membership structure indicates that data responsive to the query is not present in the output structure.

8. The method of claim 1, wherein the membership structure includes a tree-based index.

9. The method of claim 1, wherein the membership structure is a counting Bloom filter to track data in plural output structures produced by at least one of the plurality of processing stages.

10. The method of claim 1, wherein the membership structure is a Bloom filter to track data in plural output structures produced by at least one of the plurality of processing stages, and wherein a lookup of the Bloom filter is based on a value that is a combination of a search key and an identifier of one of the plural output structures, where the search key is based on data in the plural output structures.

11. The method of claim 1, further comprising:
producing an answer for the query from an output structure produced by a second of the processing stages; and
in response to the membership structure indicating that data responsive to the query is present in the output structure produced by the particular processing stage, indicating that the answer for the query from the output structure produced by the second processing stage is potentially out-of-date.

12. The method of claim 11, further comprising:
in response to the indicating, accessing the output structure produced by the particular processing stage to update the answer.

13. The method of claim 11, further comprising:
in response to the indicating, causing display of an indication at the query client that the answer is potentially out-of-date.

14. A data processing system comprising:
at least one processor;
a plurality of processing stages to apply respective operations on data; and
a query processing engine executable on the at least one processor to:
receive a query;
in response to the query, access a membership structure to determine whether partially processed data produced by a particular one of the processing stages potentially contains data responsive to the query; and
provide an output in response to the query, wherein the output has an indication regarding whether the output is potentially out-of-date, according to the determining performed based on accessing the membership structure.

15. The data processing system of claim 14, wherein the query is associated with a freshness specification, and wherein the accessed membership structure is associated with the partially processed data that is within a freshness bound specified by the freshness specification.

16. The data processing system of claim 14, wherein the membership structure includes a Bloom filter.

17. The data processing system of claim 14, wherein the output is an initial answer that potentially is out-of-date, and wherein the query processing engine is executable to further:
refine the initial answer in response to the indication indicating that the initial answer is potentially out-of-date, wherein refining the initial answer comprises:
searching partially processed data of the processing stages; and
updating the initial answer based on the searching.

18. The data processing system of claim 14, wherein the plurality of processing stages are to apply respective different operations on data updates received by the data processing system, wherein the data updates are to update at least one data table maintained by the data processing system.

19. The data processing system of claim 14, wherein the plurality of processing stages include an ingest stage and a sort stage, and wherein the membership structure is associated with the partially processed data of the ingest stage, wherein the ingest stage is to ingest data into the data processing system, and the sort stage is to sort data after ingestion of the data by the ingest stage.

20. The data processing system of claim 14, wherein the query is associated with a freshness specification, and wherein accessing the membership structure is in response to a determination based on the freshness specification that more up-to-date data is to be retrieved from the output structure produced by the particular processing stage.

21. An article comprising at least one non-transitory machine-readable storage medium storing instructions that upon execution cause a data processing system having a processor to:
produce an output structure by a particular one of a plurality of processing stages, wherein the processing stages perform respective different operations on data received by the data processing system, and wherein the output structure contains partially processed data produced by the particular processing stage;
associate a Bloom filter with the output structure produced by the particular processing stage; and
in response to a query received from a query client after the output structure has been produced by the particular processing stage, access the Bloom filter to determine whether the Bloom filter indicates that data responsive to the query is present in the partially processed data in the output structure.

22. The article of claim 21, wherein the output structure includes unsorted data output by the particular processing stage.

23. The article of claim 22, wherein the plurality of processing stages further include a sorting stage to sort the unsorted data, wherein an output structure provided by the sorting stage includes sorted data.

24. The article of claim 21, wherein the instructions upon execution cause the data processing system to further:
produce an answer for the query from an output structure produced by a second of the processing stages; and
in response to the Bloom filter indicating that data responsive to the query is present in the output structure produced by the particular processing stage, indicate that the answer for the query from the output structure produced by the second processing stage is potentially out-of-date.

* * * * *